United States Patent
Yamamoto

(10) Patent No.: US 10,142,047 B2
(45) Date of Patent: Nov. 27, 2018

(54) OPTICAL TRANSMISSION APPARATUS AND OPTICAL TRANSMISSION METHOD

(71) Applicant: FUJITSU LIMITED, Kawasaki-shi, Kanagawa (JP)

(72) Inventor: Yusaku Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/896,129

(22) Filed: Feb. 14, 2018

(65) Prior Publication Data

US 2018/0254845 A1 Sep. 6, 2018

(30) Foreign Application Priority Data

Mar. 2, 2017 (JP) .................................. 2017-039094

(51) Int. Cl.
*H04J 14/02* (2006.01)

(52) U.S. Cl.
CPC ...... *H04J 14/0212* (2013.01); *H04J 14/0221* (2013.01); *H04J 14/0256* (2013.01)

(58) Field of Classification Search
CPC .................................................. H04J 14/0212
See application file for complete search history.

(56) References Cited

U.S. PATENT DOCUMENTS

| 6,580,536 B1* | 6/2003 | Chraplyvy | H04J 14/0221 398/79 |
| 2007/0041731 A1* | 2/2007 | Yasumoto | H04B 10/032 398/140 |
| 2007/0201878 A1 | 8/2007 | Nakashima et al. | |
| 2015/0333835 A1* | 11/2015 | Matsukawa | H04B 10/60 398/48 |
| 2016/0094305 A1* | 3/2016 | Yamashita | H04J 14/0221 398/34 |

FOREIGN PATENT DOCUMENTS

| JP | 2007-235412 | 9/2007 |
| JP | 2016-72834 | 5/2016 |

* cited by examiner

*Primary Examiner* — Nathan M Cors
(74) *Attorney, Agent, or Firm* — Fujitsu Patent Center

(57) ABSTRACT

An optical transmission apparatus includes a receiver configured to receive a wavelength division multiplexing optical signal including a first optical signal modulated based on a first modulation system and a second optical signal modulated based on a second modulation system with a higher multi-level degree than the first modulation system; a wavelength selective switch configured to attenuate power of the first optical signal to a first level and attenuate power of the second optical signal to a second level lower than the first level; an optical amplifier configured to amplify the wavelength division multiplexing optical signal including the first optical signal and the second optical signal output from the wavelength selective switch; and a transmitter configured to transmit the wavelength division multiplexing optical signal amplified by the optical amplifier.

13 Claims, 15 Drawing Sheets

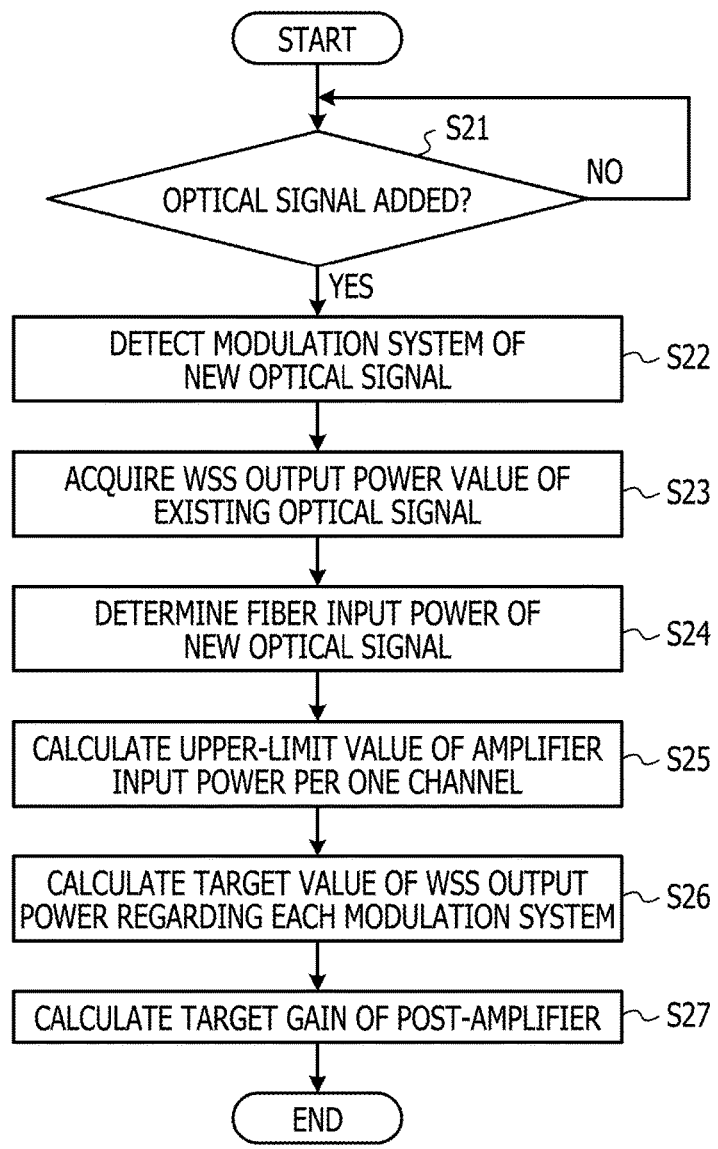

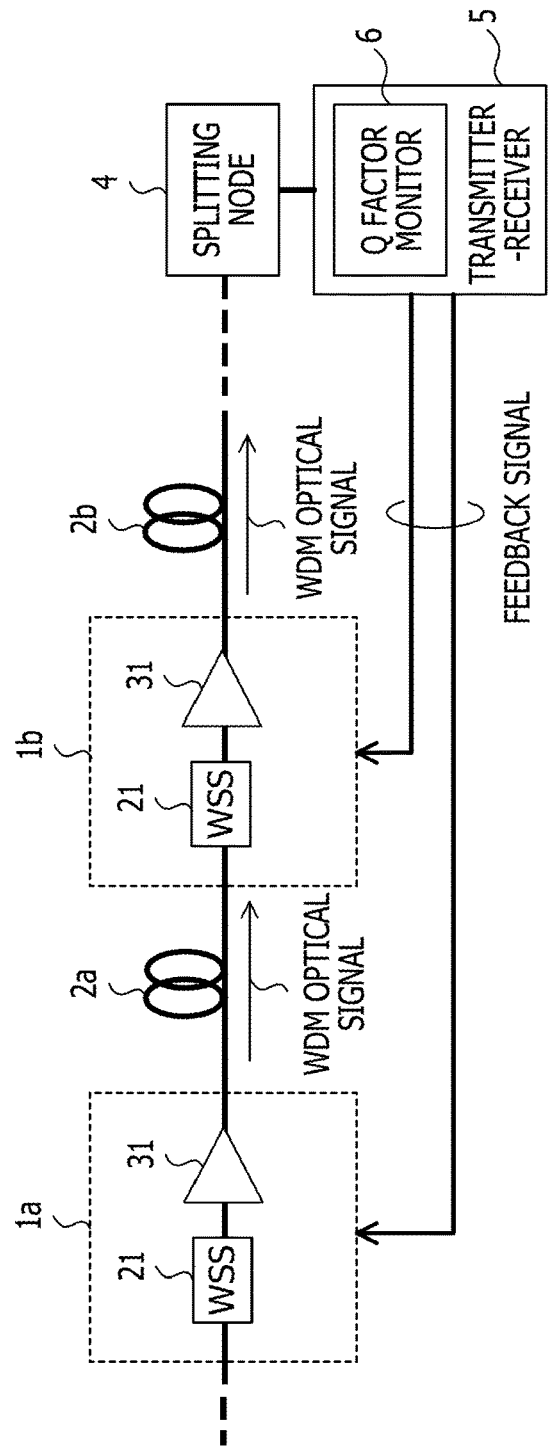

OPTICAL TRANSMISSION APPARATUS AND OPTICAL TRANSMISSION METHOD

CROSS-REFERENCE TO RELATED APPLICATION

This application is based upon and claims the benefit of priority of the prior Japanese Patent Application No. 2017-39094, filed on Mar. 2, 2017, the entire contents of which are incorporated herein by reference.

FIELD

The present disclosure is related to an apparatus and a method that transmit a wavelength division multiplexing optical signal.

BACKGROUND

In order to implement data transmission of large capacity in an optical transmission system, wavelength division multiplexing (WDM) has been put into practical use. The WDM may transmit data by using plural optical signals different in the wavelength. For example, the WDM may transmit data by using plural wavelength channels.

FIG. 1 illustrates one example of an optical transmission apparatus that transmits a WDM optical signal. The optical transmission apparatus is provided at each node of a WDM transmission system and operates as a WDM transmission apparatus that transmits a WDM optical signal.

As illustrated in FIG. 1, the optical transmission apparatus includes a preamplifier 101, a wavelength selective switch (WSS) 102, and a post-amplifier 103. The preamplifier 101 amplifies a WDM optical signal received through a transmission path fiber. The preamplifier 101 collectively amplifies plural optical signals multiplexed in the WDM optical signal. The wavelength selective switch 102 processes each wavelength channel of the WDM optical signal amplified by the preamplifier 101. For example, the wavelength selective switch 102 may adjust the optical power of each wavelength channel in the WDM optical signal. The wavelength selective switch 102 may split an optical signal with a desired wavelength from the WDM optical signal. Moreover, the wavelength selective switch 102 may insert an optical signal into an empty channel of the WDM optical signal. The post-amplifier 103 amplifies the WDM optical signal output from the wavelength selective switch 102. Similarly to the preamplifier 101, the post-amplifier 103 also collectively amplifies the plural optical signals multiplexed in the WDM optical signal.

The WDM transmission system may transmit the optical signals based on a desired modulation system about each wavelength channel. For example, the WDM transmission system may transmit the WDM optical signal in which wavelength channels of different modulation systems mixedly exist. For example, a WDM optical signal in which a QPSK optical signal, an 8-QAM optical signal, and a 16-QAM optical signal are multiplexed may be transmitted.

As a related art, an apparatus and a method that transmit optical signals different in the modulation system and the bit rate based on a wavelength multiplexing system have been proposed (for example, Japanese Laid-open Patent Publication No. 2016-72834). Moreover, an optical transmission apparatus and a system that suppress quality deterioration of an optical signal of each modulation system in a WDM transmission system in which the optical signals of different modulation systems mixedly exist have been proposed (for example, Japanese Laid-open Patent Publication No. 2007-235412).

The waveform of the optical signal deteriorates due to the nonlinear effect of the transmission path fiber. Here, the waveform deterioration due to the nonlinear effect depends on the input optical power to the transmission path fiber and the modulation system. Thus, it is preferable for the optical transmission apparatus to control the input optical power to the transmission path fiber according to the modulation system. For example, when the multi-level degree of the modulation system is higher, the transmission penalty attributed to the nonlinear effect of the transmission path fiber becomes larger. When the input optical power to the transmission path fiber is higher, the nonlinear effect of the transmission path fiber becomes larger. Therefore, it is preferable to set the input optical power to the transmission path fiber lower when the multi-level degree of the modulation system is higher. For example, it is preferable to set the fiber input power of the 16-QAM optical signal lower when the 16-QAM optical signal is compared with the QPSK optical signal. The multi-level degree of the modulation system represents the number of bits transmitted by one symbol.

In the configuration illustrated in FIG. 1, the power of each optical signal in the WDM optical signal is adjusted by the wavelength selective switch 102. However, depending on the number of optical signals multiplexed in the WDM optical signal and the type of the modulation system, the quality of the optical signal often deteriorates due to setting the fiber input power low on the contrary. For example, when the number of optical signals whose fiber input power is desired to be set low (for example, optical signals modulated based on a modulation system with a high multi-level degree) is small relative to the total number of optical signals multiplexed in the WDM optical signal, the optical signal-to-noise ratio (OSNR) of the optical signals decreases. In this case, although the signal waveform is improved by suppressing the nonlinear effect, possibly the transmission distance becomes short due to the decrease in the optical signal-to-noise ratio. In view of the above, it is desirable that the optical signal-to-noise ratio may be set high while the nonlinear effect of an optical fiber is suppressed in an optical transmission system that transmits a wavelength division multiplexing optical signal.

SUMMARY

According to an aspect of the embodiments, an optical transmission apparatus includes a receiver configured to receive a wavelength division multiplexing optical signal including a first optical signal modulated based on a first modulation system and a second optical signal modulated based on a second modulation system with a higher multi-level degree than the first modulation system; a wavelength selective switch configured to attenuate power of the first optical signal to a first level and attenuate power of the second optical signal to a second level lower than the first level; an optical amplifier configured to amplify the wavelength division multiplexing optical signal including the first optical signal and the second optical signal output from the wavelength selective switch; and a transmitter configured to transmit the wavelength division multiplexing optical signal amplified by the optical amplifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a flowchart illustrating one example of optical power control executed when a new optical signal is added to a WDM optical signal;

FIG. 10 is a diagram illustrating one example of an optical transmission system relating to a second embodiment;

DESCRIPTION OF EMBODIMENTS

Figure 1:
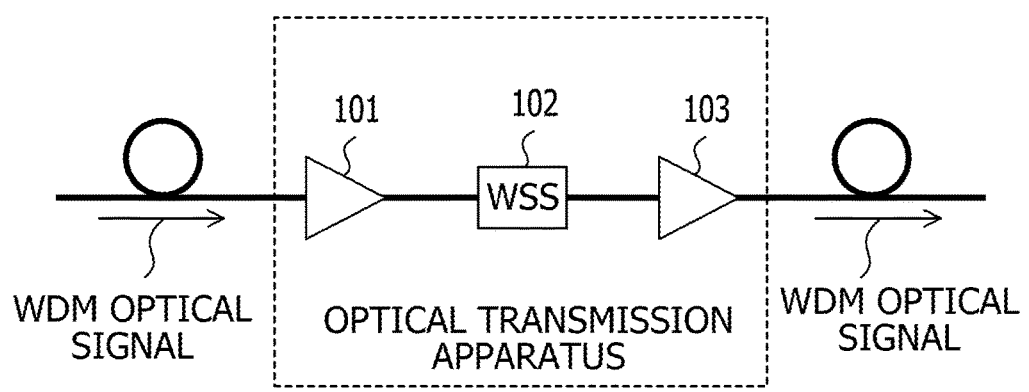
FIG. 1 is a diagram illustrating one example of an optical transmission apparatus that transmits a WDM optical signal.
Figure 2:
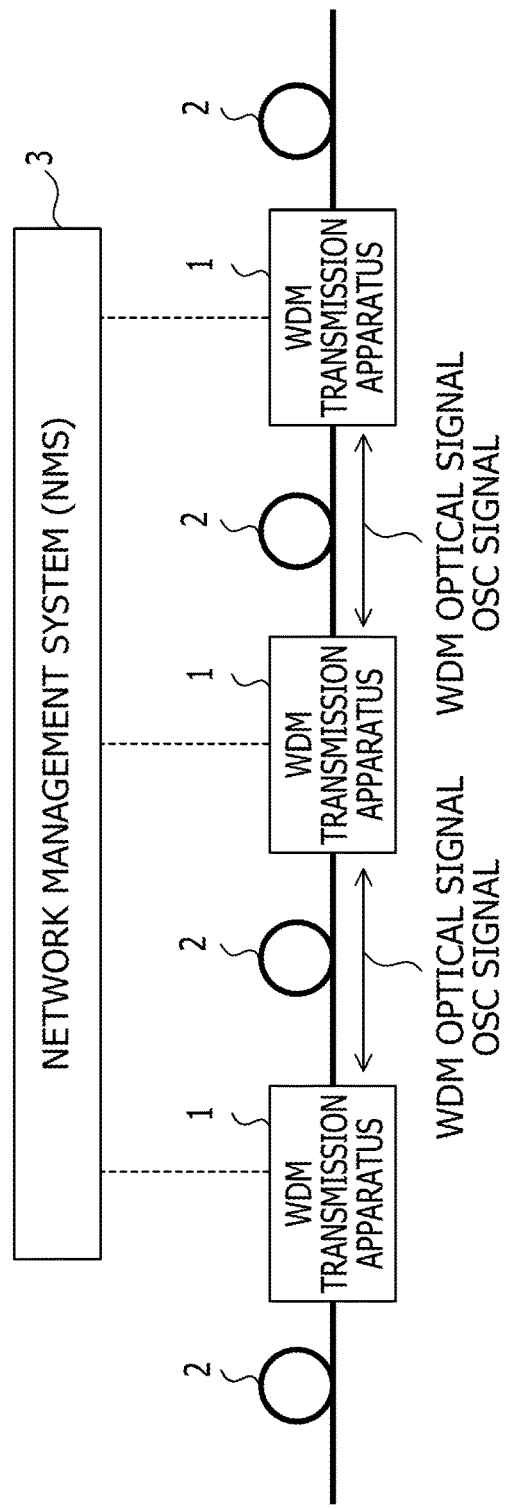
FIG. 2 is a diagram illustrating one example of an optical transmission system.

FIG. 2 illustrates one example of an optical transmission system relating to embodiments of the present disclosure. The optical transmission system transmits a WDM optical signal. Therefore, a WDM transmission apparatus 1 is provided at each node of the optical transmission system. The WDM transmission apparatus 1 is one example of optical transmission apparatus.

The nodes of the optical transmission system are coupled by an optical fiber (transmission path fiber 2). Thus, each of the WDM transmission apparatuses 1 receives the WDM optical signal from an adjacent node through the transmission path fiber 2 and transmits the WDM optical signal to an adjacent node through the transmission path fiber 2.

The WDM transmission apparatus 1 may transmit an optical supervisory channel (OSC) signal to other WDM transmission apparatuses 1. The OSC signal transmits control information for controlling the WDM transmission. For example, the control information includes information that represents the number of optical signals multiplexed into the WDM optical signal, information that represents the modulation system of each optical signal multiplexed into the WDM optical signal, information that represents used channel/unused channel, and so forth. The OSC signal may be multiplexed in the WDM optical signal. In this case, a dedicated wavelength specified in advance is allocated to the OSC signal. Alternatively, the OSC signal may be transmitted via a network management system (NMS) 3. The network management system 3 controls each of the WDM transmission apparatuses 1. For example, the network management system 3 controls setting, change, and deletion of the wavelength path by controlling one or plural of the WDM transmission apparatuses 1.

Figure 3:
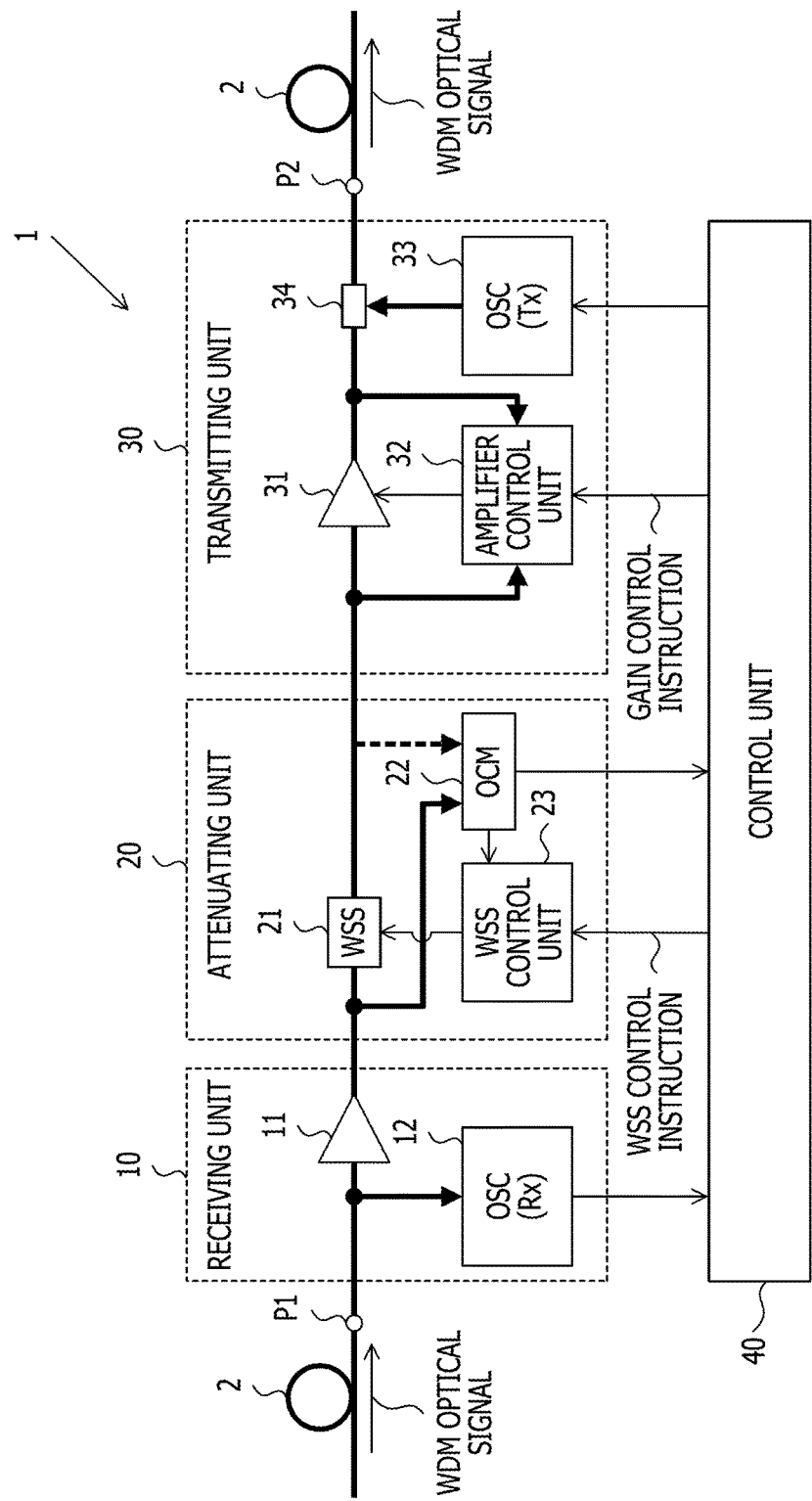
FIG. 3 is a diagram illustrating one example of an optical transmission apparatus relating to embodiments of the present disclosure.

FIG. 3 illustrates one example of an optical transmission apparatus relating to the embodiments of the present disclosure. In this embodiment example, the optical transmission apparatus is used in the optical transmission system illustrated in FIG. 2. For example, the WDM transmission apparatus 1 is one example of the optical transmission apparatus.

As illustrated in FIG. 3, the WDM transmission apparatus 1 includes a receiving unit 10, an attenuating unit 20, a transmitting unit 30, and a control unit 40. Furthermore, the WDM transmission apparatus 1 receives a WDM optical signal through a port P1. In the WDM optical signal, a first optical signal modulated based on a first modulation system and a second optical signal modulated based on a second modulation system with a higher multi-level degree than the first modulation system are multiplexed in some cases. The first modulation system and the second modulation system are the QPSK and the 16-QAM, for example. The WDM optical signal may further include an optical signal modulated based on a modulation system different from the first modulation system and the second modulation system. Moreover, in this embodiment example, the OSC signal is multiplexed in the WDM optical signal and is transmitted. The WDM transmission apparatus 1 may include other elements that are not illustrated in FIG. 3.

The receiving unit 10 includes a preamplifier 11 and an OSC receiver 12. The preamplifier 11 amplifies the received WDM optical signal by a given gain. Here, the preamplifier 11 collectively amplifies the respective optical signals multiplexed into the WDM optical signal by the same gain. The preamplifier 11 is implemented by an erbium-doped fiber amplifier (EDFA), for example. The OSC receiver 12 extracts the OSC signal from the received WDM optical signal and reproduces control information transmitted by an OSC signal. The control information is given to the control unit 40.

The attenuating unit 20 includes a wavelength selective switch (WSS) 21, an optical channel monitor (OCM) 22, and a WSS control unit 23. The wavelength selective switch 21 adjusts the power of each optical signal included in the WDM optical signal output from the receiving unit 10 according to a control signal given from the WSS control unit 23. The wavelength selective switch 21 may split an optical signal with a desired wavelength from the WDM optical signal. The wavelength selective switch 21 may insert an optical signal into an empty channel of the WDM optical signal.

The optical channel monitor 22 measures the optical power of each wavelength channel of the WDM optical signal to be input to the wavelength selective switch 21. The measurement result by the optical channel monitor 22 is given to the control unit 40. The WSS control unit 23 generates the control signal to control the state of the wavelength selective switch 21 in accordance with an instruction given from the control unit 40. For example, the attenuating unit 20 adjusts the power of each optical signal included in the WDM optical signal in accordance with the instruction given from the control unit 40.

In FIG. 3, the WDM optical signal guided to the optical channel monitor 22 is split on the input side of the wavelength selective switch 21. However, the WDM optical signal may be split in the wavelength selective switch 21. The optical channel monitor 22 may measure the optical power of each wavelength channel of the WDM optical signal output from the wavelength selective switch 21. In this case, the WSS control unit 23 may adjust the attenuation amount of each wavelength channel of the wavelength selective switch 21 by feedback control with reference to the measurement result by the optical channel monitor 22.

The transmitting unit 30 includes a post-amplifier 31, an amplifier control unit 32, an OSC transmitter 33, and an optical coupler 34. The post-amplifier 31 amplifies the WDM optical signal output from the attenuating unit 20 according to a gain control signal given from the amplifier control unit 32. Here, the post-amplifier 31 collectively amplifies the respective optical signals multiplexed into the WDM optical signal by the same gain. The post-amplifier 31 is implemented by an erbium-doped fiber amplifier, for example. The amplifier control unit 32 generates the gain control signal to control the gain of the post-amplifier 31 in accordance with an instruction given from the control unit 40. For example, the transmitting unit 30 controls the transmission power of the WDM optical signal (for example, input optical power of the transmission path fiber 2) in accordance with the instruction given from the control unit 40.

The OSC transmitter 33 generates an OSC signal that transmits control information. The control information is generated by the control unit 40. The optical coupler 34 multiplexes the WDM optical signal output from the post-amplifier 31 and the OSC signal. Then, the WDM optical signal and the OSC signal are output to the transmission path fiber 2 via a port P2. Thus, the WDM optical signal and the OSC signal output from the WDM transmission apparatus 1 are transmitted to an adjacent node via the transmission path fiber 2.

The control unit 40 controls the state of the wavelength selective switch 21 and the gain of the post-amplifier 31 based on the control information extracted from the received OSC signal and the measurement result of the optical channel monitor 22. The control unit 40 is implemented by a processor system including a processor element and a memory, for example. In this case, the processor system offers functions of the control unit 40 by executing a given program. The control unit 40 may be implemented with a digital signal processing circuit. Alternatively, the control unit 40 may be implemented by a combination of software processing and a hardware circuit.

The control unit 40 detects the number of optical signals included in the received WDM optical signal and the modulation system of each optical signal included in the received WDM optical signal based on the control information extracted from the OSC signal. The control unit 40 detects the power of each optical signal included in the WDM optical signal to be input to the wavelength selective switch 21 based on the measurement result of the optical channel monitor 22.

By using these detection results, the control unit 40 calculates the target level of the power of each optical signal included in the WDM optical signal output from the wavelength selective switch 21 regarding each wavelength channel. Then, the control unit 40 generates a WSS control instruction for adjusting the power of each optical signal included in the WDM optical signal output from the wavelength selective switch 21 to a respective one of the target levels and gives the WSS control instruction to the WSS control unit 23. Then, the WSS control unit 23 controls the wavelength selective switch 21 in accordance with the WSS control instruction. As a result, the power of each optical signal included in the WDM optical signal output from the wavelength selective switch 21 is adjusted to the target level calculated by the control unit 40.

The control unit 40 calculates the target gain of the post-amplifier 31 by using the above-described detection results. Then, the control unit 40 generates a gain control instruction that represents the target gain of the post-amplifier 31 and gives the gain control instruction to the amplifier control unit 32. Then, the amplifier control unit 32 controls the post-amplifier 31 in accordance with the gain control instruction. As a result, the gain of the post-amplifier 31 is controlled to the target gain calculated by the control unit 40.

In the following description, the power of the optical signal to be input to the wavelength selective switch 21 will be often referred to as "WSS input power." The power of the optical signal output from the wavelength selective switch 21 will be often referred to as "WSS output power." The power of the optical signal to be input to the post-amplifier 31 will be often referred to as "amplifier input power." The power of the optical signal output from the WDM transmission apparatus 1 to the transmission path fiber 2 will be often referred to as "fiber input power."

First Embodiment

Figure 4A:
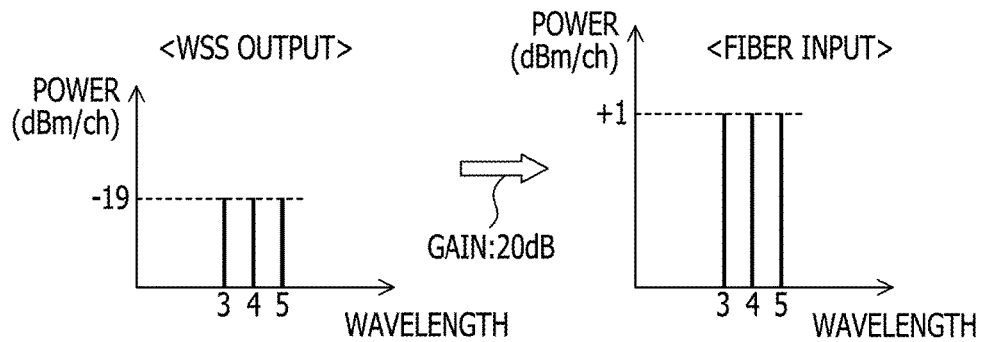
FIG. 4A, FIG. 4B, and FIG. 4C are diagrams illustrating one example of optical power control in a first embodiment.
Figure 4B:
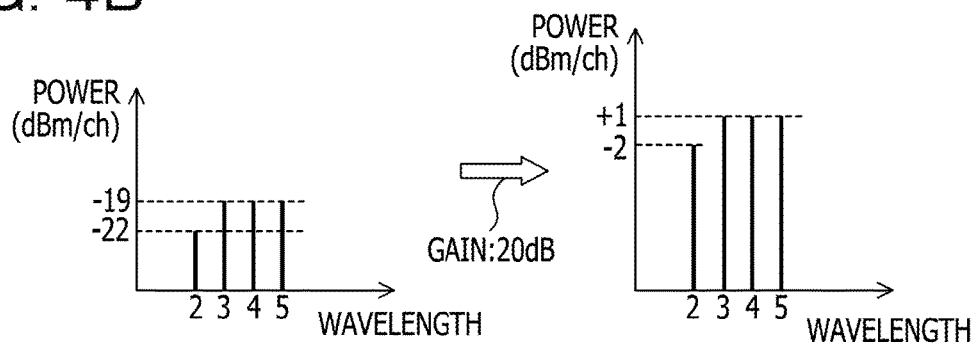
Figure 4C:
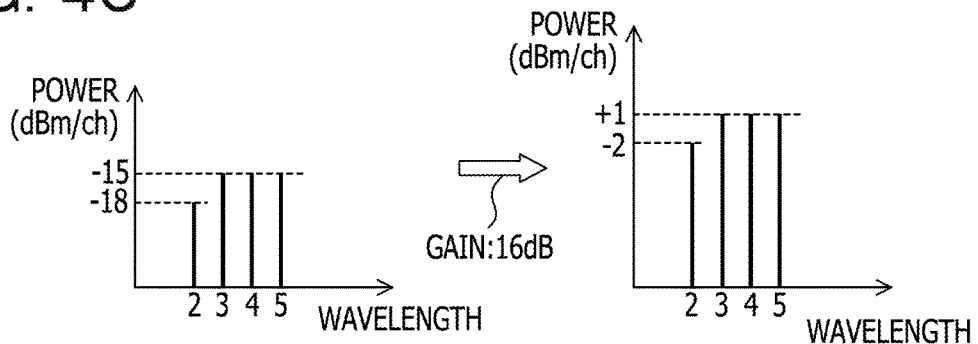

FIG. 4A, FIG. 4B, and FIG. 4C illustrate one example of optical power control in a first embodiment. Here, the output power of the wavelength selective switch 21 and the output power of the WDM transmission apparatus 1 (for example, input power of the transmission path fiber 2) in the WDM transmission apparatus 1 illustrated in FIG. 3 are represented. In FIG. 4A, FIG. 4B, and FIG. 4C, the abscissa axis of each graph represents the wavelength of the optical signal. However, the wavelength of the optical signal is represented by the channel number with which the wavelength channel used in the WDM transmission is identified. The ordinate axis of each graph represents the optical power of each channel.

Wavelength channels 3 to 5 each transmit an optical signal modulated based on the QPSK. In the following description, an optical signal transmitted via wavelength channel i (i=1, 2, 3, . . . ) will be often referred to as "optical signal i." For example, optical signals 3 to 5 are individually transmitted via wavelength channels 3 to 5.

When an optical signal is transmitted via the transmission path fiber 2, the waveform of the optical signal deteriorates due to the nonlinear effect of the transmission path fiber 2. However, if the input optical power of the transmission path fiber 2 is properly controlled, the waveform deterioration due to the nonlinear effect is suppressed. On the other hand, the influence due to the nonlinear effect of the transmission path fiber 2 depends on the modulation system of the optical signal. Thus, in the WDM transmission system, it is preferable that the target level of the input optical power of the transmission path fiber 2 be determined in advance regarding each modulation system. Furthermore, the WDM transmission apparatus 1 outputs optical signals at the target level determined regarding each modulation system. In this example, as illustrated in FIG. 4A, the WDM transmission apparatus 1 outputs each of optical signals 3 to 5 modulated based on the QPSK at +1 [dBm/ch].

In the example illustrated in FIG. 4A, the gain of the post-amplifier 31 is 20 [dB]. In this case, the wavelength selective switch 21 adjusts the attenuation amount for optical signals 3 to 5 in such a manner that optical signals 3 to 5 are each output from the wavelength selective switch 21 at −19 [dBm/ch].

Suppose that wavelength channel 2 is added to the above-described WDM optical signal. Wavelength channel 2 transmits optical signal 2 modulated based on the 16-QAM. Here, when the multi-level degree of the modulation system is higher, the influence attributed to the nonlinear effect in the transmission path fiber 2 becomes larger. Therefore, it is preferable that the target level of the fiber input power for the 16-QAM be set low compared with the QPSK. In this embodiment example, as illustrated in FIG. 4B, the WDM transmission apparatus 1 outputs optical signal 2 modulated based on the 16-QAM at −2 [dBm/ch].

Here, suppose that the gain of the post-amplifier 31 is 20 [dB] as with the example illustrated in FIG. 4A. In this case, as illustrated in FIG. 4B, the wavelength selective switch 21 adjusts the optical power of optical signal 2 to −22 [dBm/ch] and adjusts the optical power of each of optical signals 3 to 5 to −19 [dBm/ch].

However, the optical signal-to-noise ratio (hereinafter, OSNR) often deteriorates in the case in which the gain of the post-amplifier 31 does not change when the number of optical signals included in the WDM optical signal has changed as illustrated in FIG. 4A and FIG. 4B. Here, the OSNR is represented by the following expression, for example.

$$OSNR = k + Pin - NF$$

k is a given constant. Pin represents the input optical power of the post-amplifier 31. NF is the noise figure of the post-amplifier 31. Therefore, as illustrated in FIG. 4B, the OSNR of optical signal 2 deteriorates when the input power of optical signal 2 in the post-amplifier 31 (for example, power of optical signal 2 output from the wavelength selective switch 21) is low.

The problem may be solved by properly controlling the gain of the post-amplifier 31 when the number of optical signals included in the WDM optical signal has changed. Therefore, the WDM transmission apparatus 1 relating to the first embodiment has a function of controlling both the attenuation amount of the wavelength selective switch 21 and the gain of the post-amplifier 31 when the number of optical signals included in the WDM optical signal has changed.

For example, when optical signal 2 has been added to optical signals 3 to 5, as illustrated in FIG. 4C, the wavelength selective switch 21 adjusts the optical power of optical signal 2 to −18 [dBm/ch] and adjusts the optical power of each of optical signals 3 to 5 to −15 [dBm/ch] according to an instruction from the control unit 40. The control unit 40 decreases the gain of the post-amplifier 31 from 20 [dB] to 16 [dB].

As above, compared with the example illustrated in FIG. 4B, the amplifier input power Pin of each optical signal becomes high and the OSNR of each optical signal is improved in the example illustrated in FIG. 4C. As a result, the deterioration of the quality attributed to decrease in the OSNR is suppressed particularly in the optical signal modulated based on a modulation system with a high multi-level degree (here, optical signal 2 modulated based on the 16-QAM). The fiber input power is the same in FIG. 4B and FIG. 4C. Therefore, even when the optical power is controlled as illustrated in FIG. 4C in the WDM transmission apparatus 1, the quality deterioration attributed to the nonlinear effect of the transmission path fiber 2 does not occur.

Figure 5:
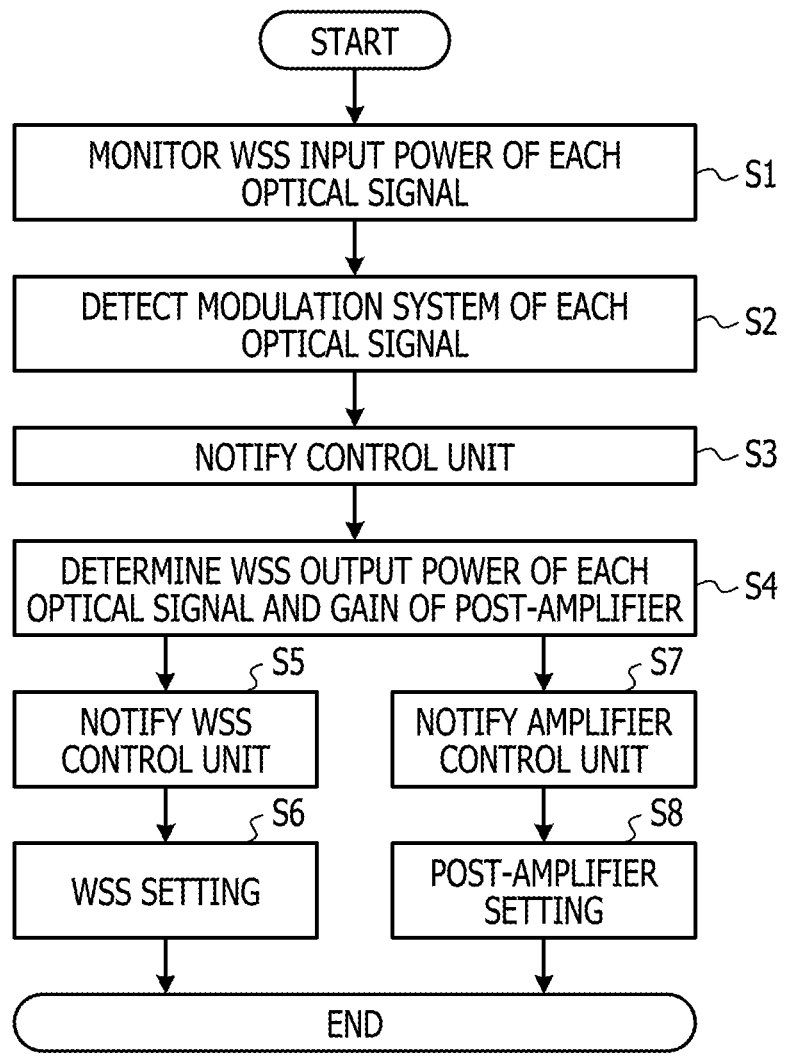
FIG. 5 is a flowchart illustrating one example of start-up operation of a WDM transmission apparatus.

FIG. 5 is a flowchart illustrating one example of start-up operation of a WDM transmission apparatus. The WDM transmission apparatus illustrated by reference to FIG. 5 may be the WDM transmission apparatus 1 depicted in FIG. 2. The processing of the flowchart is executed when the WDM transmission apparatus 1 starts transmission of a WDM optical signal.

In S1, the optical channel monitor 22 measures the WSS input optical power of each optical signal included in the WDM optical signal. In S2, the OSC receiver 12 extracts control information from an OSC signal received from an adjacent node. The control information includes information that represents the modulation system of each optical signal included in the WDM optical signal. The measurement result of S1 and the control information extracted in S2 are notified to the control unit 40 in S3. The measurement result of S1 is also notified to the WSS control unit 23.

In S4, the control unit 40 calculates the target value of the WSS output power of each optical signal and the target gain of the post-amplifier 31 based on the measurement result of S1 and the control information extracted in S2. The calculation method of S4 will be described later.

In S5, the control unit 40 notifies the WSS control unit 23 of the target value of the WSS output power of each optical signal. Then, in S6, the WSS control unit 23 controls the state of the wavelength selective switch 21 in accordance with the notification. For example, the WSS control unit 23 controls the wavelength selective switch 21 in such a manner that the power of each optical signal output from the wavelength selective switch 21 comes close to a respective one of the target values. For example, suppose that the WSS input power of optical signal 3 is −10 [dBm/ch] and the target value of the WSS output power of optical signal 3 is −15 [dBm/ch]. In this case, the WSS control unit 23 sets the attenuation amount for optical signal 3 to 5 [dB].

In S7, the control unit 40 notifies the amplifier control unit 32 of the target gain of the post-amplifier 31. Then, in S8, the amplifier control unit 32 controls the gain of the post-amplifier 31 in accordance with the notification.

Next, one example of the method for deciding the target value of the WSS output power and the target gain of the post-amplifier 31 will be described. The following description is based on the assumption that the WDM optical signal may include an optical signal modulated based on the QPSK and an optical signal modulated based on the 16-QAM. Suppose that the target value of the fiber input power is specified in advance. In this embodiment example, a target value $P_{IN\_QPSK}$ of the fiber input power of the QPSK optical signal is +1 [dBm/ch]. A target value $P_{IN\_16\_QAM}$ of the fiber input power of the 16-QAM optical signal is −2 [dBm/ch].

Figure 6:
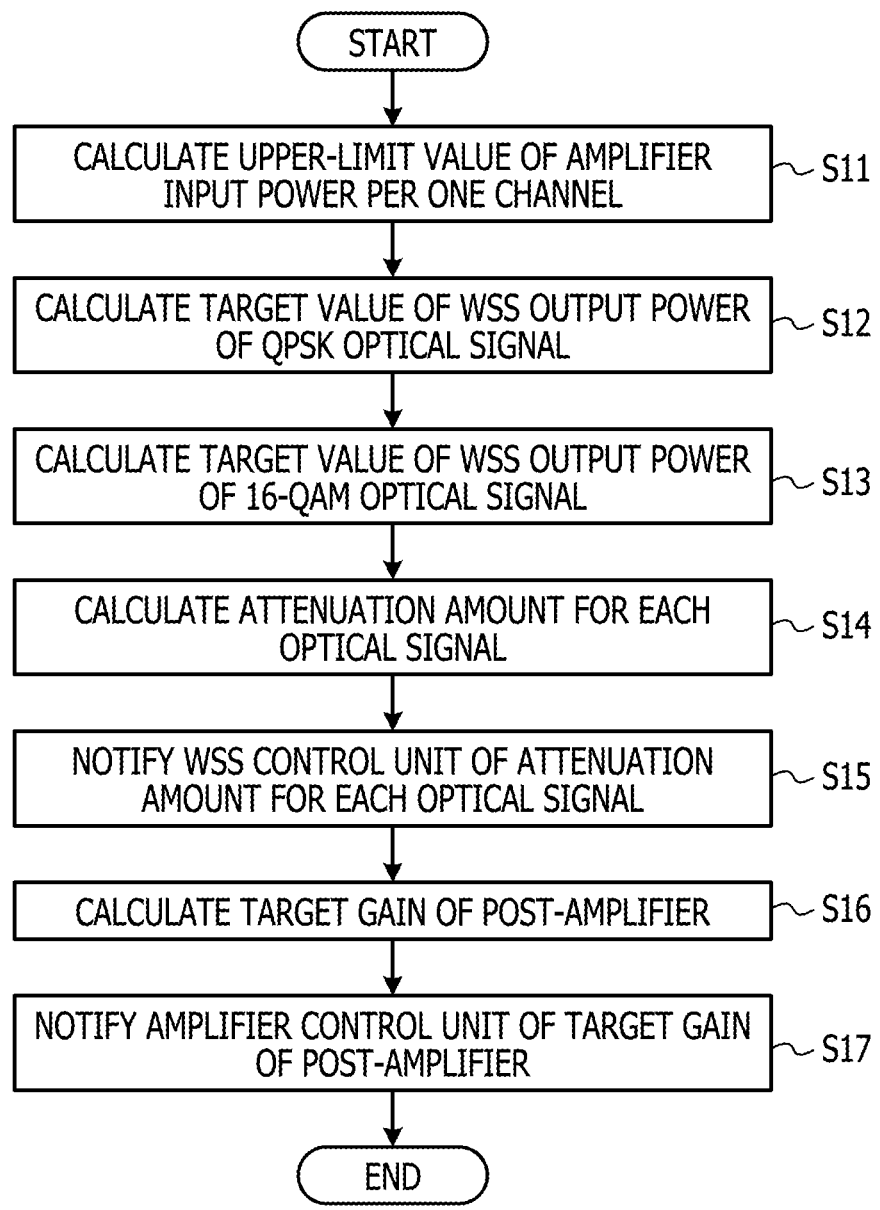
FIG. 6 is a flowchart illustrating one example of a method for deciding a target value of WSS output power and target gain of a post-amplifier.

FIG. 6 is a flowchart illustrating one example of a method for deciding a target value of WSS output power and target gain of a post-amplifier. The post-amplifier illustrated by reference to FIG. 6 may be the post-amplifier 31 depicted in FIG. 3. The processing of the flowchart is equivalent to S4 represented in FIG. 5.

In S11, the control unit 40 detects the number of optical signals included in the WDM optical signal by using an OSC signal received from an adjacent node. Then, the control unit 40 calculates an upper-limit value Pmax of the amplifier input power per one channel based on the capability of the post-amplifier 31 and the number of optical signals included in the WDM optical signal. The capability of the post-amplifier 31 is represented by the noise figure NF of the post-amplifier 31, for example.

Figure 7:
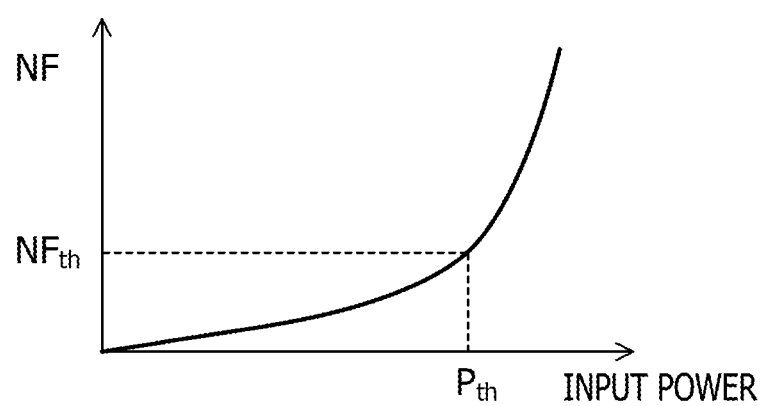
FIG. 7 is a diagram illustrating one example of characteristics of a post-amplifier.

The noise figure of the post-amplifier 31 depends on the input optical power as illustrated in FIG. 7. In the region in which the input optical power is low, the slope of the noise figure with respect to the input optical power is gentle. On the other hand, in the region in which the input optical power is high, the slope of the noise figure with respect to the input optical power is steep. Hereinafter, the optical power across which the slope of the noise figure with respect to the input optical power changes from the gentle state to the steep state will be often referred to as "upper-limit power Pth." However, the upper-limit power Pth may be determined by another method. For example, the upper-limit power Pth may be input optical power with which a given noise figure NFth is generated. Alternatively, the upper-limit power Pth may be determined based on the maximum value of the region in which the output optical power is linearly amplified with respect to the input optical power.

The control unit 40 calculates the upper-limit value Pmax of the amplifier input power per one channel based on the upper-limit power Pth and the number of optical signals included in the WDM optical signal. As one example, the upper-limit value Pmax is calculated by dividing the upper-limit power Pth by the number of optical signals included in the WDM optical signal.

In S12, the control unit 40 determines the target value of the WSS output power of the QPSK optical signal. A target value $P_{WSS\_QPSK}$ of the WSS output power of the QPSK optical signal is calculated by the following expression.

$$P_{WSS\_QPSK} = P\text{max} - \Delta P$$

$\Delta P$ is equivalent to a margin for keeping the total input power of the post-amplifier 31 from surpassing the upper-limit power Pth. Therefore, $\Delta P$ may be zero.

In S13, the control unit 40 determines the target value of the WSS output power of the 16-QAM optical signal. A target value $P_{WSS\_16\ QAM}$ of the WSS output power of the 16-QAM optical signal is calculated by the following expression.

$$P_{WSS\_16\ QAM} = P_{WSS\_QPSK} - 3\ [dB]$$

"3" is equivalent to the difference between the target value $P_{IN\_QPSK}$ of the fiber input power of the QPSK optical signal and the target value $P_{IN\_16\ QAM}$ of the fiber input power of the 16-QAM optical signal.

As above, in this embodiment example, the target value of the WSS output power of the optical signal modulated based on the modulation system with the lowest multi-level degree (for example, QPSK optical signal) is calculated by dividing the upper-limit power Pth of the post-amplifier 31 by the number of optical signals included in the WDM optical signal. Thereafter, the target value of the WSS output power of the optical signal modulated based on the other modulation system (for example, 16-QAM optical signal) is calculated by using the difference in the fiber input power.

In S14, the control unit 40 calculates the attenuation amount for each optical signal in the wavelength selective switch 21. The attenuation amount of each optical signal is calculated from the WSS input power measured by the optical channel monitor 22 and the target value of the WSS output power. For example, when the WSS input power of a certain QPSK optical signal is P1, the attenuation amount for the QPSK optical signal is equivalent to the difference between P1 and the target value $P_{WSS\_QPSK}$. When the WSS input power of a certain 16-QAM optical signal is P2, the attenuation amount for the 16-QAM optical signal is equivalent to the difference between P2 and the target value $P_{WSS\_16\ QAM}$.

In S15, the control unit 40 notifies the WSS control unit 23 of the attenuation amount for each optical signal. Then, the WSS control unit 23 controls the attenuation amount for the wavelength channels in the wavelength selective switch 21 in accordance with the notification from the control unit 40.

In the example represented in FIG. 6, the attenuation amount of the wavelength selective switch 21 is calculated in the control unit 40. However, the first embodiment is not limited to this method. For example, the control unit 40 may notify the target value of the WSS output power to the WSS control unit 23. In this case, the WSS control unit 23 calculates the attenuation amount of the wavelength selective switch 21 based on the WSS input power and the WSS output power. Alternatively, while measuring the power of each optical signal output from the wavelength selective switch 21, the WSS control unit 23 may carry out feedback control in such a manner that the respective measurement values each come close to the target value.

In S16, the control unit 40 calculates the target gain of the post-amplifier 31. In this embodiment example, the control unit 40 calculates the target gain of the post-amplifier 31 based on the target value of the WSS output power and the target value of the fiber input power. As one example, the target gain of the post-amplifier 31 is calculated by dividing the target value $P_{IN\_QPSK}$ of the fiber input power by the target value $P_{WSS\_QPSK}$ of the WSS output power (in decibel calculation, by subtraction). Alternatively, the target gain of the post-amplifier 31 may be calculated by dividing the target value $P_{IN\_16\ QAM}$ of the fiber input power by the target value $P_{WSS\_16\ QAM}$ of the WSS output power.

In S17, the control unit 40 notifies the amplifier control unit 32 of the target gain of the post-amplifier 31. Then, the amplifier control unit 32 controls the post-amplifier 31 in such a manner that the post-amplifier 31 operates with the target gain.

The procedure of the flowchart illustrated in FIG. 6 will be described with reference to the example illustrated in FIG. 4C. The following description is based on the assumption that −15 [dBm/ch] is calculated as the upper-limit value Pmax of the amplifier input power per one channel in S11. In this case, in S12, −15 [dBm/ch] is calculated as the target value $P_{WSS\_QPSK}$ of the WSS output power of the QPSK optical signal. Suppose that the margin $\Delta P$ is zero. In S13, −18 [dBm/ch] is calculated as the target value $P_{WSS\_16\ QAM}$ of the WSS output power of the 16-QAM optical signal. Here, the target value $P_{IN\_QPSK}$ of the fiber input power is +1 [dBm/ch]. Thus, 16 [dB] is obtained in the gain of the post-amplifier 31 in S16.

FIG. 8 is a flowchart illustrating one example of optical power control executed when a new optical signal is added to a WDM optical signal.

In S21, the control unit 40 monitors whether or not a new optical signal has been added to a WDM optical signal. Suppose that, in this embodiment example, when a new optical signal is added to a WDM optical signal, the wavelength and the modulation system of the new optical signal are notified to each node by an OSC signal. In this case, the control unit 40 may determine whether or not a new optical signal has been added to the WDM optical signal based on the received OSC signal.

When a new optical signal has been added to the WDM optical signal, the control unit 40 detects the modulation system of the new optical signal in S22. The modulation system of the new optical signal is notified by the OSC signal as described above.

In S23, the control unit 40 detects the WSS output power of the existing optical signal in the WDM optical signal. The WSS output power of the existing optical signal is notified from the WSS control unit 23 to the control unit 40, for example. In S24, the control unit 40 determines the target value of the fiber input power of the new optical signal. The target value of the fiber input power is uniquely determined in advance regarding the modulation system. Thus, the control unit 40 may determine the target value of the fiber input power of the new optical signal by detecting the modulation system of the new optical signal.

In S25, the control unit 40 calculates the upper-limit value of the amplifier input power per one channel. The processing of S25 is substantially the same as the processing of S11 represented in FIG. 6 and therefore description is omitted. In S26, the control unit 40 calculates the target value of the WSS output power regarding each modulation system. The processing of S26 is substantially the same as the processing of S12 and S13 represented in FIG. 6 and therefore description is omitted. In S27, the control unit 40 calculates the target gain of the post-amplifier 31. The processing of S27 is substantially the same as the processing of S16 represented in FIG. 6 and therefore description is omitted. When the optical signal in the WDM optical signal is reduced, the control unit 40 updates the attenuation amount of the wavelength selective switch 21 and the gain of the post-amplifier 31 by carrying out S21 and S25 to S27 in the flowchart illustrated in FIG. 8.

As above, the WDM transmission apparatus 1 of the first embodiment may detect increase and reduction in the optical signal in the WDM optical signal by monitoring the OSC signal. Furthermore, when detecting increase or reduction in the optical signal in the WDM optical signal, the WDM transmission apparatus 1 may update the attenuation amount of the wavelength selective switch 21 and the gain of the post-amplifier 31 in such a manner that the nonlinear effect in the transmission path fiber 2 is suppressed and the OSNR is kept from being decreased. For example, according to the first embodiment, the power of each optical signal may be adjusted to keep the communication quality from being lowered by automatic control when the optical signal in the WDM optical signal is increased or reduced.

Figure 9A:
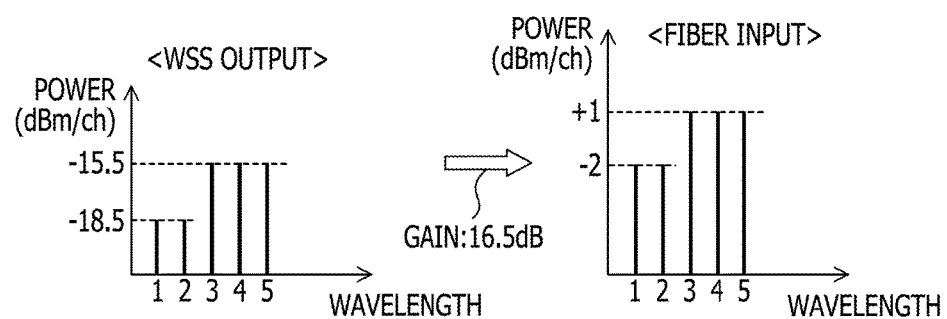
FIG. 9A, FIG. 9B and FIG. 9C are diagrams illustrating variations of optical power control in the first embodiment.
Figure 9B:
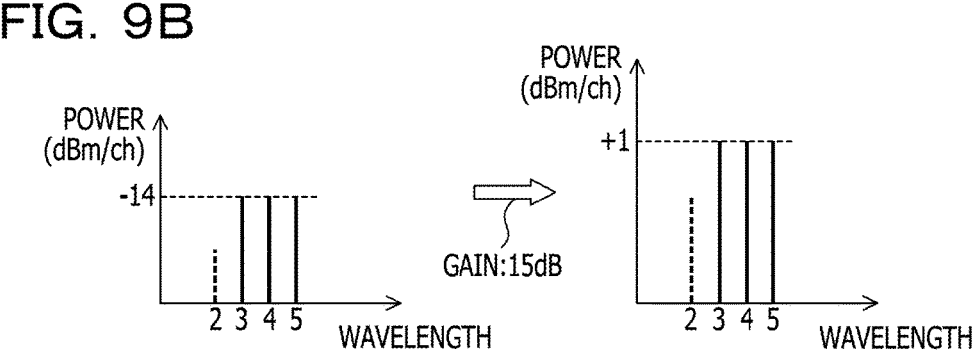
Figure 9C:
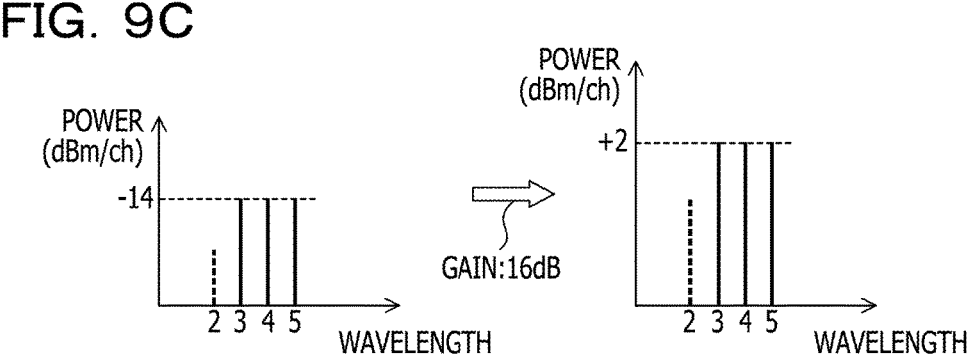

FIG. 9A, FIG. 9B and FIG. 9C illustrate variations of optical power control in the first embodiment. Suppose that optical signals 1 and 2 are modulated based on the 16-QAM and optical signals 3 to 5 are modulated based on the QPSK. Suppose that the target values of the fiber input power of the QPSK and the 16-QAM are +1 [dBm/ch] and −2 [dBm/ch], respectively.

FIG. 9A illustrates an example of the optical power control when optical signal 1 has been added to the WDM optical signal illustrated in FIG. 4C. In this case, because the number of optical signals included in the WDM optical signal increases, the upper-limit value of the amplifier input power per one channel is corrected from −15 [dBm/ch] to −15.5 [dBm/ch]. As a result, the target value of the WSS output power of the QPSK optical signals (optical signals 3 to 5) is corrected from −15 [dBm/ch] to −15.5 [dBm/ch]. The target value of the WSS output power of the 16-QAM optical signals (optical signals 1 and 2) is corrected from −18 [dBm/ch] to −18.5 [dBm/ch]. Moreover, the target gain of the post-amplifier 31 is corrected from 16 [dB] to 16.5 [dB].

FIG. 9B illustrates an example of the optical power control when optical signal 2 has been deleted from the WDM optical signal illustrated in FIG. 4C. In this case, because the number of optical signals included in the WDM optical signal decreases, the upper-limit value of the amplifier input power per one channel is corrected from −15 [dBm/ch] to −14 [dBm/ch]. As a result, the target value of the WSS output power of the QPSK optical signals (optical signals 3 to 5) is corrected from −15 [dBm/ch] to −14 [dBm/ch]. Moreover, the target gain of the post-amplifier 31 is corrected from 16 [dB] to 15 [dB].

However, in the case illustrated in FIG. 9B, only optical signals whose multi-level degree is low are left in the WDM optical signal after optical signal 2 is deleted. Here, if the optical signal is modulated by the modulation system with a low multi-level degree, the influence due to the nonlinear effect is small even when the fiber input power is high. Thus, if only optical signals whose multi-level degree is low are left in the WDM optical signal, the target gain of the post-amplifier 31 does not have to be corrected from the state illustrated in FIG. 4C as illustrated in FIG. 9C. As a result, the OSNR is improved.

As above, in the first embodiment, suitable fiber input power is implemented for each modulation system by properly controlling the attenuation amount for each optical signal in the wavelength selective switch 21 and the gain of the post-amplifier 31. Due to this, the nonlinear effect of the optical fiber to each optical signal is suppressed. The wavelength selective switch 21 and the post-amplifier 31 are controlled in such a manner that the power of the wavelength division multiplexing optical signal to be input to the post-amplifier 31 comes close to the given upper-limit level determined based on characteristics of the post-amplifier 31. For example, the amplifier input power of each optical signal is maximized within the range in which the power of the wavelength division multiplexing optical signal to be input to the post-amplifier 31 does not surpass the upper-limit level. For example, according to the optical power control of the first embodiment illustrated in FIG. 4C, the WSS output power (for example, amplifier input power) becomes high compared with the example illustrated in FIG. 4B. As a result, the OSNR of each optical signal (particularly, optical signal modulated based on a modulation system with a high multi-level degree) is improved.

Second Embodiment

FIG. 10 illustrates one example of an optical transmission system relating to a second embodiment. In this embodiment example, a WDM optical signal is transmitted via WDM transmission apparatuses 1a, 1b, . . . . The configuration and operation of each of the WDM transmission apparatuses 1a, 1b, . . . are the same as the WDM transmission apparatus 1 illustrated in FIG. 3. The WDM transmission apparatuses 1a and 1b are coupled by a transmission path fiber 2a. The WDM transmission apparatus 1b and the next node are coupled by a transmission path fiber 2b.

Figure 11A:
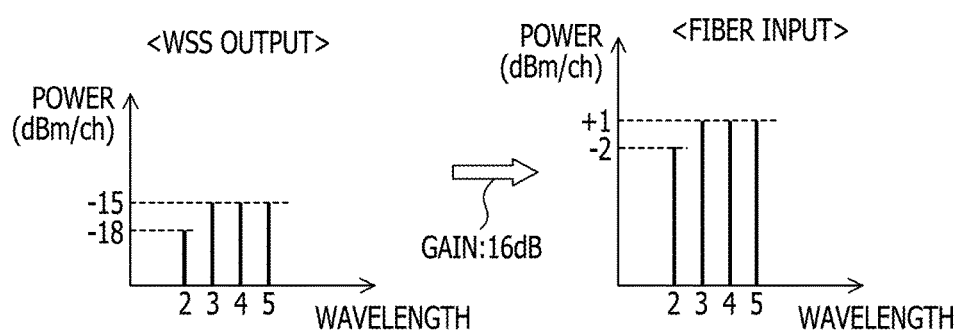
FIG. 11A and FIG. 11B are diagrams illustrating one example of optical power control in the second embodiment.

As illustrated in FIG. 11A, optical signal 2 modulated based on the 16-QAM and optical signals 3 to 5 modulated based on the QPSK are multiplexed into the WDM optical signal. Each of the WDM transmission apparatuses 1a, 1b, . . . carries out optical power control illustrated in FIG. 11A. For example, the WSS output power of optical signal 2 is controlled to −18 [dBm/ch] and the WSS output power of each of optical signals 3 to 5 is controlled to −15 [dBm/ch]. The fiber input power of optical signal 2 is controlled to −2 [dBm/ch] and the fiber input power of each of optical signals 3 to 5 is controlled to +1 [dBm/ch].

A splitting node 4 is one of nodes at which the WDM transmission apparatus 1 is implemented, and houses a transmitter-receiver 5. Furthermore, in this embodiment example, the splitting node 4 splits optical signal 2 from the WDM optical signal and guides optical signal 2 to the transmitter-receiver 5.

The transmitter-receiver 5 reproduces data from optical signal 2 and guides optical signal 2 to a client. The transmitter-receiver 5 includes a Q factor monitor 6 that measures the quality of a received optical signal. The Q factor monitor 6 measures the Q factor by counting the bit error rate or the number of FEC corrections, for example.

The Q factor measured in the transmitter-receiver 5 is notified to each of the WDM transmission apparatuses 1a, 1b, . . . by using a feedback signal. Then, each of the WDM transmission apparatuses 1a, 1b, . . . carries out optical power control in the self-apparatus in such a manner that the notified Q factor becomes the maximum.

Figure 11B:
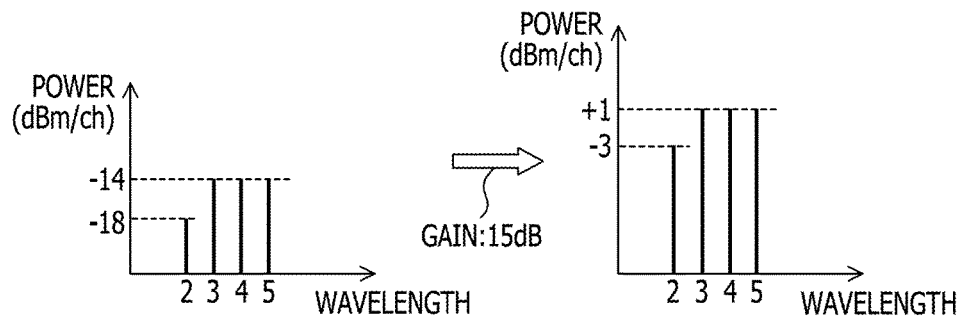

For example, the WDM transmission apparatus 1a decreases the fiber input power of optical signal 2 to −3 [dBm/ch] as illustrated in FIG. 11B in order to suppress the nonlinear effect in the transmission path fiber 2a. At this time, in the WDM transmission apparatus 1a, the target gain of the post-amplifier 31 is corrected to 15 [dB] without changing the target value of the WSS output power of optical signal 2. As a result, the nonlinear effect to optical signal 2 in the transmission path fiber 2a is suppressed. In order to keep the fiber input power of each of optical signals 3 to 5 at +1 [dBm/ch], the target value of the WSS output power of optical signals 3 to 5 is corrected to −14 [dBm/ch].

The transmitter-receiver 5 measures the Q factor of optical signal 2 and notifies each of the WDM transmission apparatuses 1a, 1b, . . . of the measurement result. Then, when the Q factor is improved through the optical power control illustrated in FIG. 11B, the setting of the WDM transmission apparatus 1a is kept at the state represented in FIG. 11B. On the other hand, when the Q factor deteriorates or does not change through the optical power control illustrated in FIG. 11B, the setting of the WDM transmission apparatus 1a is returned to the state represented in FIG. 11A.

Subsequently, similar optical power control is carried out in the WDM transmission apparatus 1b and the setting of the WDM transmission apparatus 1b is determined according to the Q factor. Similarly, the setting of each node is determined according to the Q factor. At this time, it is preferable to carry out the above-described optical power control sequentially from the section in which optical loss is low. However, the above-described optical power control may be carried out sequentially from the node located on the upstream side.

As above, in the second embodiment, the setting of each node is controlled by using the measurement result of the reception quality and thus the communication quality is improved.

Third Embodiment

Figure 12:
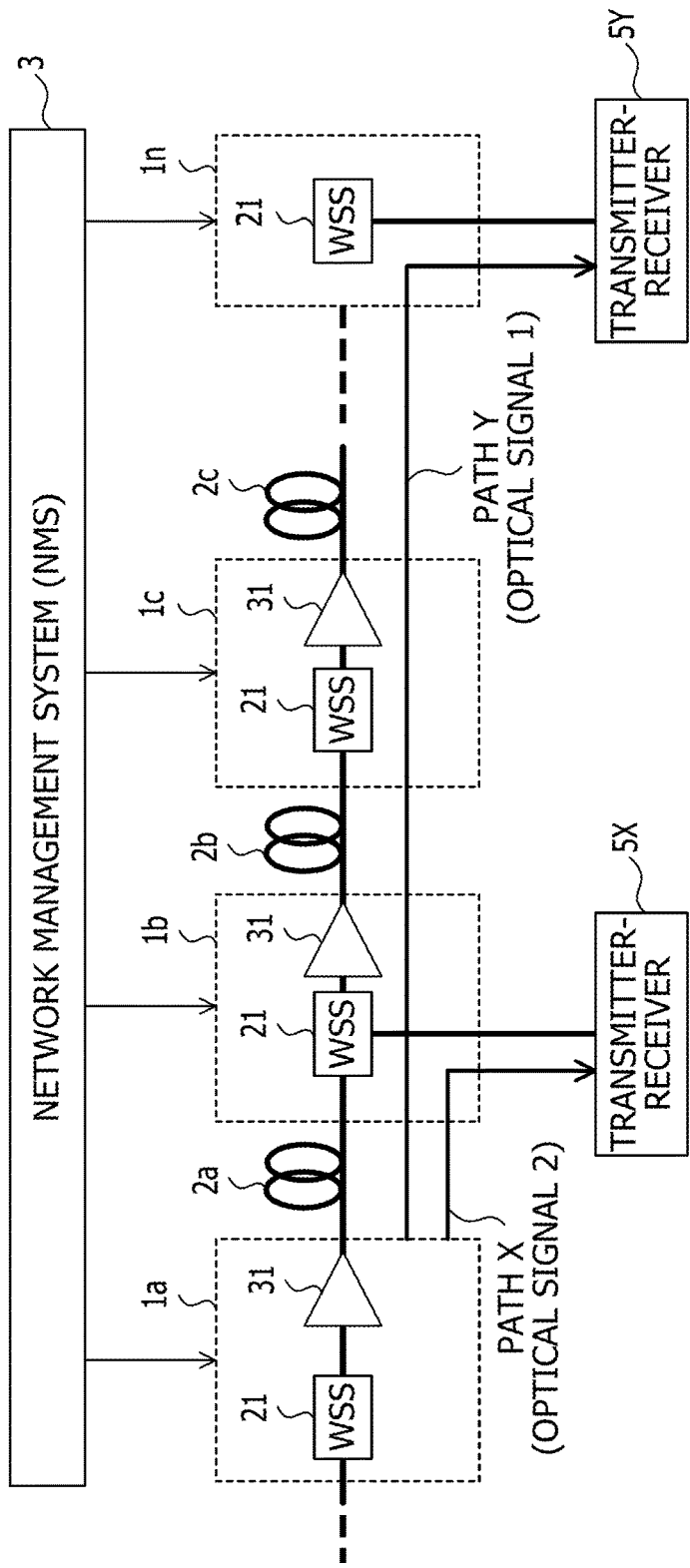
FIG. 12 illustrates one example of an optical transmission system relating to a third embodiment.
Figure 13:
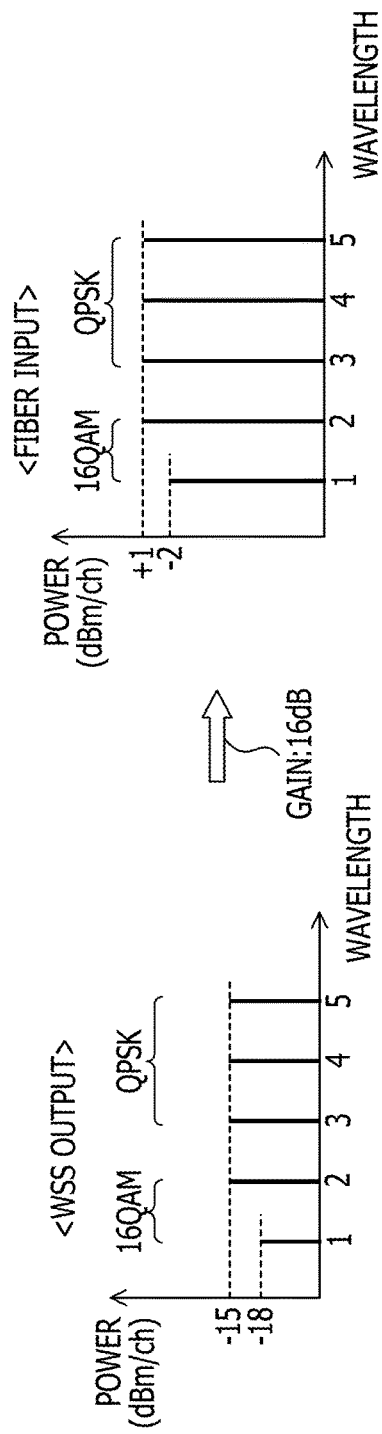
FIG. 13 is a diagram illustrating one example of optical power control in the third embodiment.

FIG. 12 illustrates one example of an optical transmission system relating to a third embodiment. In this embodiment example, a WDM optical signal is transmitted via WDM transmission apparatuses 1a, 1b, 1c, . . . . Here, the WDM optical signal transmitted from the WDM transmission apparatus 1a includes optical signals 1 and 2 modulated based on the 16-QAM and optical signals 3 to 5 modulated based on the QPSK as illustrated in FIG. 13. However, optical signal 2 is split in the WDM transmission apparatus 1b and is guided to a transmitter-receiver 5X. For example, optical signal 2 is transmitted via wavelength path X. Meanwhile, optical signal 1 is split in the WDM transmission apparatus 1n and is guided to a transmitter-receiver 5Y. For example, optical signal 1 is transmitted via wavelength path Y. Suppose that, in FIG. 12, the WDM transmission apparatus 1a is implemented at the starting-point node of optical signals 1 and 2.

As above, optical signals 1 and 2 are different from each other in the transmission distance although being generated based on the same modulation system (in this example, 16-QAM). For example, the transmission distance of optical signal 1 is long whereas the transmission distance of optical signal 2 is short.

When the transmission distance is short, the influence of the nonlinear effect of the transmission path fiber is small even if the optical signal is an optical signal modulated based on a modulation system with a high multi-level degree. Therefore, when the transmission distance is short, setting the fiber input power higher to improve the reception OSNR is more advantageous in improvement in the communication quality (for example, bit error rate and so forth) than setting the fiber input power lower to suppress the nonlinear effect in some cases. Therefore, in the third embodiment, the fiber input power at each node is set according to the transmission distance of each optical signal.

For example, the WDM transmission apparatus 1a sets the fiber input power of each optical signal as illustrated in FIG. 13. For example, because the transmission distance of optical signal 1 is long, the target value of the fiber input power of optical signal 1 is −2 [dBm/ch]. On the other hand, because the transmission distance of optical signal 2 is short, the target value of the fiber input power of optical signal 2 is +1 [dBm/ch]. Therefore, the target value of the WSS output power of optical signal 1 is set to −18 [dBm/ch] whereas the target value of the WSS output power of optical signal 2 is set to −15 [dBm/ch]. In the example illustrated in FIG. 13, the target gain of the post-amplifier 31 is 16 [dB].

The network management system (NMS) 3 manages the topology of the optical transmission system and the wavelength paths set on the optical transmission system. Furthermore, the network management system 3 notifies path information that represents characteristics of a respective one of the wavelength paths to the corresponding WDM transmission apparatus. The path information represents the transmission distance between the starting-point node and the ending-point node, the number of spans, the type of the transmission path fiber, and so forth. Furthermore, each of the WDM transmission apparatuses 1a, 1b, 1c, . . . carries out optical power control according to the path information notified from the network management system 3.

As above, according to the third embodiment, suppression of the nonlinear effect in the transmission path fiber and improvement in the OSNR may be effectively implemented according to the transmission distance.

Fourth Embodiment

Figure 14:
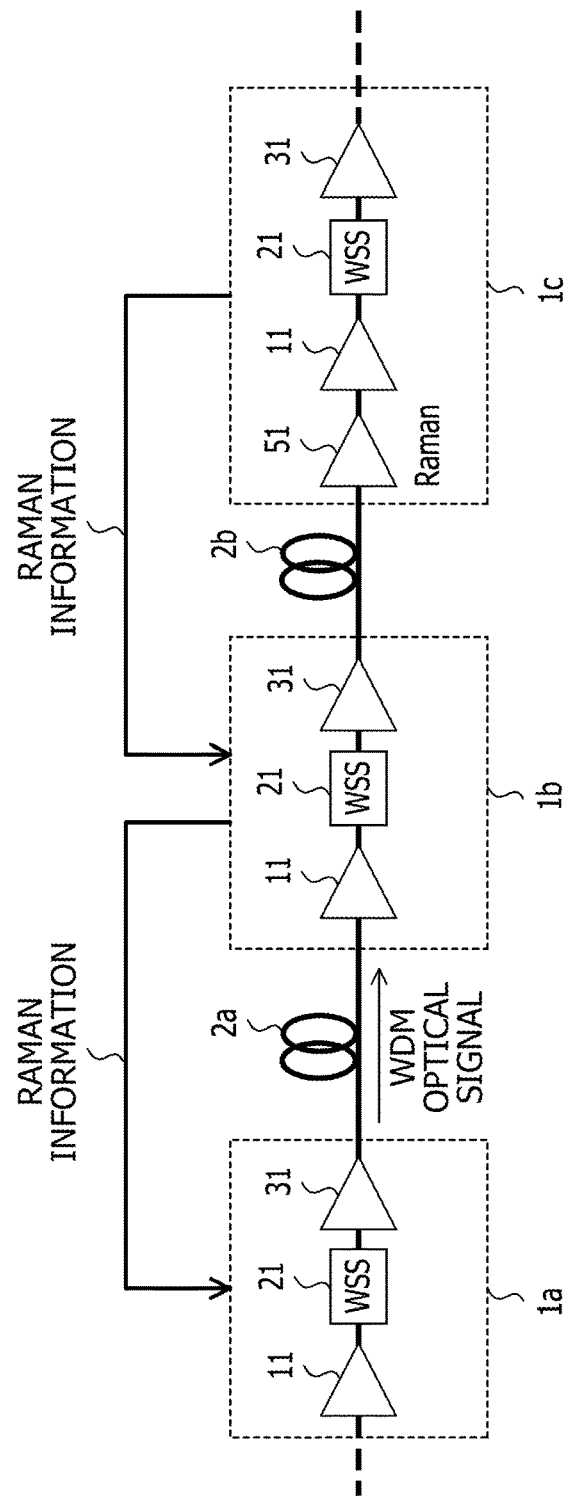
FIG. 14 illustrates one example of an optical transmission system relating to a fourth embodiment.

FIG. 14 illustrates one example of an optical transmission system relating to a fourth embodiment. In this embodiment example, a WDM optical signal is transmitted via WDM transmission apparatuses 1a, 1b, 1c, . . . . Here, the WDM optical signal includes optical signal 2 modulated based on the 16-QAM and optical signals 3 to 5 modulated based on the QPSK as illustrated in FIG. 15.

In the optical transmission system relating to the fourth embodiment, Raman amplification is carried out at several nodes. In the example illustrated in FIG. 14, the WDM transmission apparatus 1c includes a Raman amplifier 51. The Raman amplifier 51 generates a gain by supplying excitation light to a transmission path fiber. In this example, the Raman amplifier 51 generates a Raman gain by backward pumping. For example, the Raman amplifier 51 generates the Raman gain in a transmission path fiber 2b by supplying excitation light to the transmission path fiber 2b.

If a transmission path fiber provides a Raman gain, the WDM transmission apparatus coupled to the transmission side of the transmission path fiber may lower the fiber input power according to the Raman gain. In the example illustrated in FIG. 14, the transmission path fiber 2b provides a Raman gain because the WDM transmission apparatus 1c includes the Raman amplifier 51. In this case, the WDM transmission apparatus 1b coupled to the transmission side of the transmission path fiber 2b may lower the fiber input power.

Figure 15A:
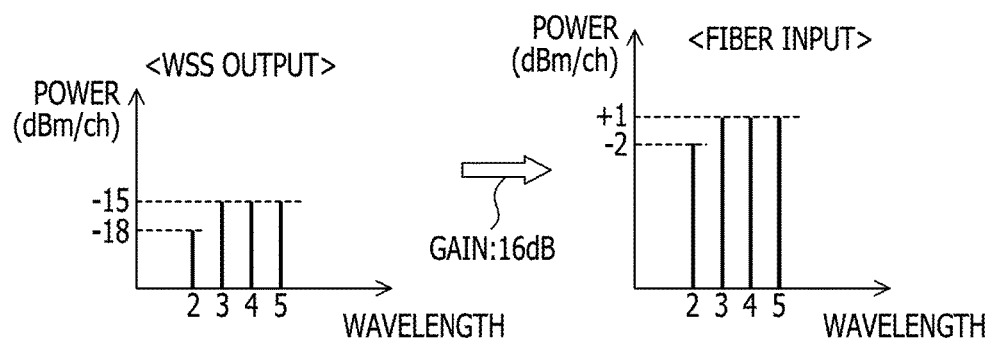
FIG. 15A and FIG. 15B are diagrams illustrating one example of optical power control in the fourth embodiment.

FIG. 15A illustrates one example of optical power control at a node coupled to a transmission path fiber without a Raman gain. For example, FIG. 15A illustrates one example of optical power control in the WDM transmission apparatus 1a illustrated in FIG. 14. In the WDM transmission apparatus 1a, the target value of the fiber input power of optical signals 3 to 5 modulated based on the QPSK is +1 [dBm/ch] and the target value of the fiber input power of optical signal 2 modulated based on the 16-QAM is −2 [dBm/ch].

Figure 15B:
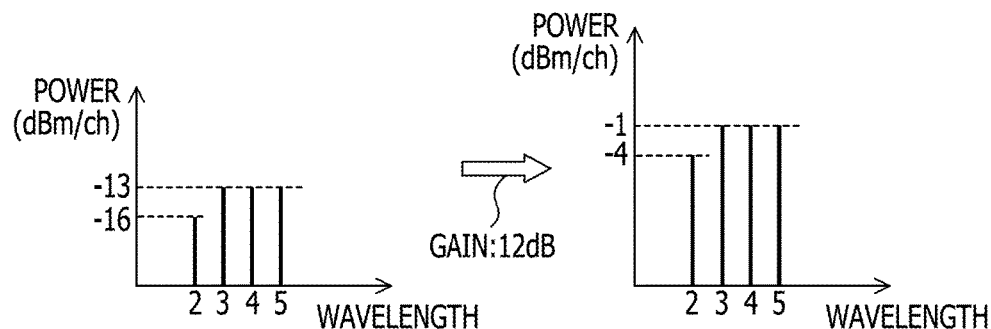

FIG. 15B illustrates one example of optical power control at a node coupled to transmission side of a transmission path fiber that provides a Raman gain. For example, FIG. 15B illustrates one example of optical power control in the WDM transmission apparatus 1b illustrated in FIG. 14. In the WDM transmission apparatus 1b, the target value of the fiber input power is set low compared with the WDM transmission apparatus 1a in consideration of the Raman gain of the transmission path fiber 2b. In this embodiment example, the Raman gain is 2 [dB]. In this case, in the WDM transmission apparatus 1b, the target value of the fiber input power of optical signals 3 to 5 modulated based on the QPSK is corrected to −1 [dBm/ch] and the target value of the fiber input power of optical signal 2 modulated based on the 16-QAM is corrected to −4 [dBm/ch]. When the fiber input power is lowered in this manner, the nonlinear effect in the transmission path fiber to the optical signal generated by the modulation system with a high multi-level degree (here, 16-QAM) is suppressed.

Each of the WDM transmission apparatuses 1a, 1b, 1c, ... notifies an adjacent node of Raman information that represents whether or not Raman amplification is carried out in the self-node. The Raman information is notified by using the OSC signal, for example. In the example illustrated in FIG. 14, the Raman information that represents that Raman amplification is not carried out in the WDM transmission apparatus 1b is notified from the WDM transmission apparatus 1b to the WDM transmission apparatus 1a. The Raman information that represents that Raman amplification is carried out in the WDM transmission apparatus 1c is notified from the WDM transmission apparatus 1c to the WDM transmission apparatus 1b. Then, the respective WDM transmission apparatuses 1a, 1b, 1c, ... carry out the optical power control illustrated in FIG. 15A and FIG. 15B in consideration of the Raman information notified from the adjacent node.

As above, according to the fourth embodiment, the fiber input power is optimized in consideration of whether or not a Raman amplifier exists and thus the quality of the optical signal is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus, comprising:
    a receiver configured to receive a wavelength division multiplexing optical signal including a first optical signal modulated based on a first modulation system and a second optical signal modulated based on a second modulation system with a higher multi-level degree than the first modulation system;
    a wavelength selective switch configured to attenuate power of the first optical signal to a first level and attenuate power of the second optical signal to a second level lower than the first level;
    an optical amplifier configured to amplify the wavelength division multiplexing optical signal including the first optical signal and the second optical signal output from the wavelength selective switch; and
    a transmitter configured to transmit the wavelength division multiplexing optical signal amplified by the optical amplifier.

2. The optical transmission apparatus according to claim 1, further comprising:
    a processor configured to control the wavelength selective switch in such a manner that power of the wavelength division multiplexing optical signal to be input to the optical amplifier comes close to an upper-limit level determined based on characteristics of the optical amplifier.

3. The optical transmission apparatus according to claim 2, further comprising:
    an optical channel monitor configured to measure the power of the first optical signal and the power of the second optical signal,
    wherein the processor is configured to:
        receive a measurement result of the power of the first optical signal and the power of the second optical signal from the optical channel monitor, and
        transmit an instruction for adjusting the power of the first optical signal and the power of the second optical signal to the wavelength selective switch based on the received measurement result.

4. The optical transmission apparatus according to claim 2, wherein
    the processor is configured to:
        control the wavelength selective switch and the optical amplifier in such a manner that the power of the first optical signal to be input to an optical fiber comes close to a first target level and the power of the second optical signal to be input to the optical fiber comes close to a second target level lower than the first target level, and
        determine a third target level and a fourth target level lower than the third target level by difference between the first target level and the second target level, and
    the wavelength selective switch is configured to:
        attenuate the power of the first optical signal to the third target level, and
        attenuate the power of the second optical signal to the fourth target level.

5. The optical transmission apparatus according to claim 4, wherein
the processor is configured to
determine a target gain of the optical amplifier based on difference between the first target level and the third target level or difference between the second target level and the fourth target level, and
the optical amplifier is configured to
amplify the wavelength division multiplexing optical signal output from the wavelength selective switch by the target gain.

6. The optical transmission apparatus according to claim 4, wherein the processor is configured to
determine the third target level by dividing the upper-limit level by the number of optical signals included in the wavelength division multiplexing optical signal to be input to the optical amplifier.

7. The optical transmission apparatus according to claim 2, wherein the processor is configured to
correct the second target level based on quality of the second optical signal measured at a node that receives the wavelength division multiplexing optical signal.

8. The optical transmission apparatus according to claim 2, wherein the processor is configured to
determine the second target level based on transmission distance between the optical transmission apparatus and an adjacent node that receives the wavelength division multiplexing optical signal.

9. The optical transmission apparatus according to claim 2, wherein the processor is configured to
determine the second target level according to whether or not Raman amplification is carried out at an adjacent node that receives the wavelength division multiplexing optical signal.

10. An optical transmission method executed by an optical transmission apparatus, the optical transmission method comprising:
receiving, by a receiver, a wavelength division multiplexing optical signal including a first optical signal modulated based on a first modulation system and a second optical signal modulated based on a second modulation system with a higher multi-level degree than the first modulation system;
attenuating, by a wavelength selective switch, power of the first optical signal to a first level and attenuating power of the second optical signal to a second level lower than the first level;
amplifying, by an optical amplifier, the wavelength division multiplexing optical signal including the first optical signal and the second optical signal output from the wavelength selective switch; and
transmitting, by a transmitter, the wavelength division multiplexing optical signal amplified by the optical amplifier.

11. The optical transmission method according to claim 10, further comprises
controlling, by a processor, the wavelength selective switch in such a manner that power of the wavelength division multiplexing optical signal to be input to the optical amplifier comes close to an upper-limit level determined based on characteristics of the optical amplifier.

12. The optical transmission method according to claim 10, further comprises:
measuring, by an optical channel monitor, the power of the first optical signal and the power of the second optical signal,
receiving, by the processor, a measurement result of the power of the first optical signal and the power of the second optical signal from the optical channel monitor, and
transmitting, by the processor, an instruction for adjusting the power of the first optical signal and the power of the second optical signal to the wavelength selective switch based on the received measurement result.

13. The optical transmission method according to claim 11, further comprises:
correcting, by the processor, the second target level based on quality of the second optical signal measured at a node that receives the wavelength division multiplexing optical signal.

* * * * *